United States Patent

Miyazawa

[11] Patent Number: 5,836,280
[45] Date of Patent: Nov. 17, 1998

[54] LUBRICATION SYSTEM FOR TWO CYCLE ENGINE

[75] Inventor: Kazuo Miyazawa, Iwata, Japan

[73] Assignee: Yamaha Hatsudoki Kabushiki Kaisha, Iwata, Japan

[21] Appl. No.: 562,159

[22] Filed: Nov. 22, 1995

[30] Foreign Application Priority Data

Nov. 24, 1994 [JP] Japan ................................. 6-289772

[51] Int. Cl.$^6$ ................................. F02F 3/10; F02F 3/12
[52] U.S. Cl. ................................. 123/193.4; 123/196 M; 92/223
[58] Field of Search ............................. 123/193.6, 193.4, 123/196 M, 196 R; 92/223

[56] References Cited

U.S. PATENT DOCUMENTS

| | | | |
|---|---|---|---|
| 3,906,923 | 9/1975 | Harker | 123/193 |
| 4,334,927 | 6/1982 | Hyde et al. | |
| 4,377,967 | 3/1983 | Pelizzoni | 92/186 |
| 4,425,138 | 1/1984 | Davis | |
| 4,839,073 | 6/1989 | Gutierrez et al. | 252/51.5 |
| 4,955,353 | 9/1990 | Amataka et al. | 123/668 |
| 5,094,149 | 3/1992 | Munro | 92/222 |
| 5,341,866 | 8/1994 | Munro | 164/98 |
| 5,435,872 | 7/1995 | Penrice | 123/193.6 |
| 5,487,364 | 1/1996 | Takeda et al. | 123/193.6 |
| 5,531,195 | 7/1996 | Onoda et al. | 123/193.6 |
| 5,624,890 | 4/1997 | Miyazawa | 123/196 R |

FOREIGN PATENT DOCUMENTS

| | | |
|---|---|---|
| 2370204 | 6/1978 | France . |
| 2430286 | 2/1980 | France . |

OTHER PUBLICATIONS

1. Patent Abstracts of Japan, vol, 011 No. 213 & JP–A–62 029749.
2. Patent Abstracts of Japan, vol. 018 No. 127 & JP–A–05 312269.
3. European Search Report dated Mar. 13, 1996.

Primary Examiner—Erick R. Solis
Attorney, Agent, or Firm—Knobbe, Martens, Olson & Bear LLP

[57] ABSTRACT

A feature of the invention resides in a plating arrangement for a piston that reciprocates within a cylinder. The piston includes a generally cylindrical piston body. The piston body includes a piston head with a nickel plating and a piston skirt with a tin plating provided at the circumference of the piston body. At least one piston ring groove with a molybdenum disulfide plating is provided in the piston skirt at an upper portion of the piston body. A piston ring with a chromium and resin layer is disposed in each of the piston ring grooves. The piston body includes a piston pin hole that defines an inner diameter surface of the piston. The inner diameter surface has a molybdenum disulfide plating. The plating arrangement for the piston enhances lubrication of the piston.

Additionally, the present invention includes a lubricating system for a two-cycle, crankcase compression, diesel engine, comprising a cylinder block and head assembly, the cylinder block and head assembly includes a plurality of cylinders, a piston disposed in each of said cylinders so as to reciprocate in an axial direction of said cylinders, and the oil includes a polyisobutane additive for further enhancing lubrication of the piston.

9 Claims, 7 Drawing Sheets

LUBRICATION SYSTEM FOR TWO CYCLE ENGINE

BACKGROUND OF THE INVENTION

This invention relates generally to a lubrication system for an internal combustion engine, and more particularly, to a lubricating system, a lubricant and piston and/or piston ring plating arrangement that enhances lubrication of a piston.

Lightweight aluminum alloys have been used in the cylinder blocks and pistons of vehicle engines in order to reduce their weight. However, if both the pistons and cylinders are constructed of aluminum alloys, friction abrasion may occur on the sliding surfaces of the cylinders and pistons. Thus, cast iron sleeves, or liners, are generally installed in the cylinders so that the aluminum alloy of the piston contacts a dissimilar material. These liners help reduce wear on the piston skirt and inside surface of the cylinder and prevent piston seizure. However, since cast iron sleeve inserts are heavy, and efforts have been made to make multi-cylinder engines more compact and lighter, engines have been designed that provide plating coatings on the inside surfaces of the aluminum alloy cylinders and/or on the piston skirts as an alternative to inserting cylinder sleeves.

Although providing plating coatings can contribute to the reduction of the weight and size of the engine, the inside surface of the cylinders and the skirts of the pistons may still be subject to wear and lubricity is not necessarily improved.

In order to reduce wear on the sliding surfaces and improve lubricity between the piston and cylinder, a plating coating containing a dispersoid substance has been provided on the inner surface of the cylinders. This type of plating includes grooves and striations that provide sufficient hardness for the inner cylinder sliding surfaces to reduce wear on the sliding surfaces. These grooves and striations also retain oil provided to the cylinders for lubrication. Such arrangements can be improved. The grooves and striations must be of a sufficient depth to retain oil and lubricate the piston and cylinder surfaces or frictional wear and seize will occur. On the other hand, if these grooves and striations are too large and deep, the coefficient of friction on the cylinder surface will be too high, resulting in friction abrasion and poor engine performance.

The present invention includes a lubrication system with a molybdenum disulfide, nickel and tin plating arrangement for the piston in conjunction with a sleeveless plated cylinder that eliminates the above problems and provides additional advantages. The plating arrangement of the present invention provides the sliding surfaces of the piston and the inside surface of the cylinder with excellent lubricity properties. Frictional wear on the piston skirt and inside surface of the cylinder significantly reduced as a result. Additionally, this plating arrangement prevents exhaust carbon build-up in the cylinders and prevents piston rings from sticking problems, eliminating uneven wear on the piston ring surfaces.

Because it is vital to the operation of an internal combustion engine to provide the engine with a suitable lubricant, is a further object of the lubrication system and plating arrangement of the present invention to provide the system with a lubricating oil that further enhances lubrication in the engine, specifically the piston. The oil of the present invention includes a polyisobutane additive that helps prevent excess wear by providing an adequate oil film, prevents deposit accumulation and removes heat from the areas of relatively high temperature within the engine.

SUMMARY OF THE INVENTION

A feature of the invention resides in a plating arrangement for a piston that reciprocates within a cylinder. The piston includes a generally cylindrical piston body. The piston body includes a piston head with a nickel plating and a piston skirt with a tin plating provided at the circumference of the piston body. At least one piston ring groove with a molybdenum disulfide plating is provided in the piston skirt at an upper portion of the piston body. A piston ring with a chromium and resin layer is disposed in each of the piston ring grooves. The piston body includes a piston pin hole that defines an inner diameter surface of the piston. The inner diameter surface has a molybdenum disulfide plating. The plating arrangement for the piston enhances lubrication of the piston.

Additionally, the present invention includes a lubricating system for a two-cycle, crankcase compression, diesel engine, comprising a cylinder block and head assembly, the cylinder block and head assembly includes a plurality of cylinders, a piston disposed in each of said cylinders so as to reciprocate in an axial direction of said cylinders, and the oil includes a polyisobutane additive for further enhancing lubrication of the piston.

DETAILED DESCRIPTION OF THE PREFERRED EMBODIMENT

Figure 1:
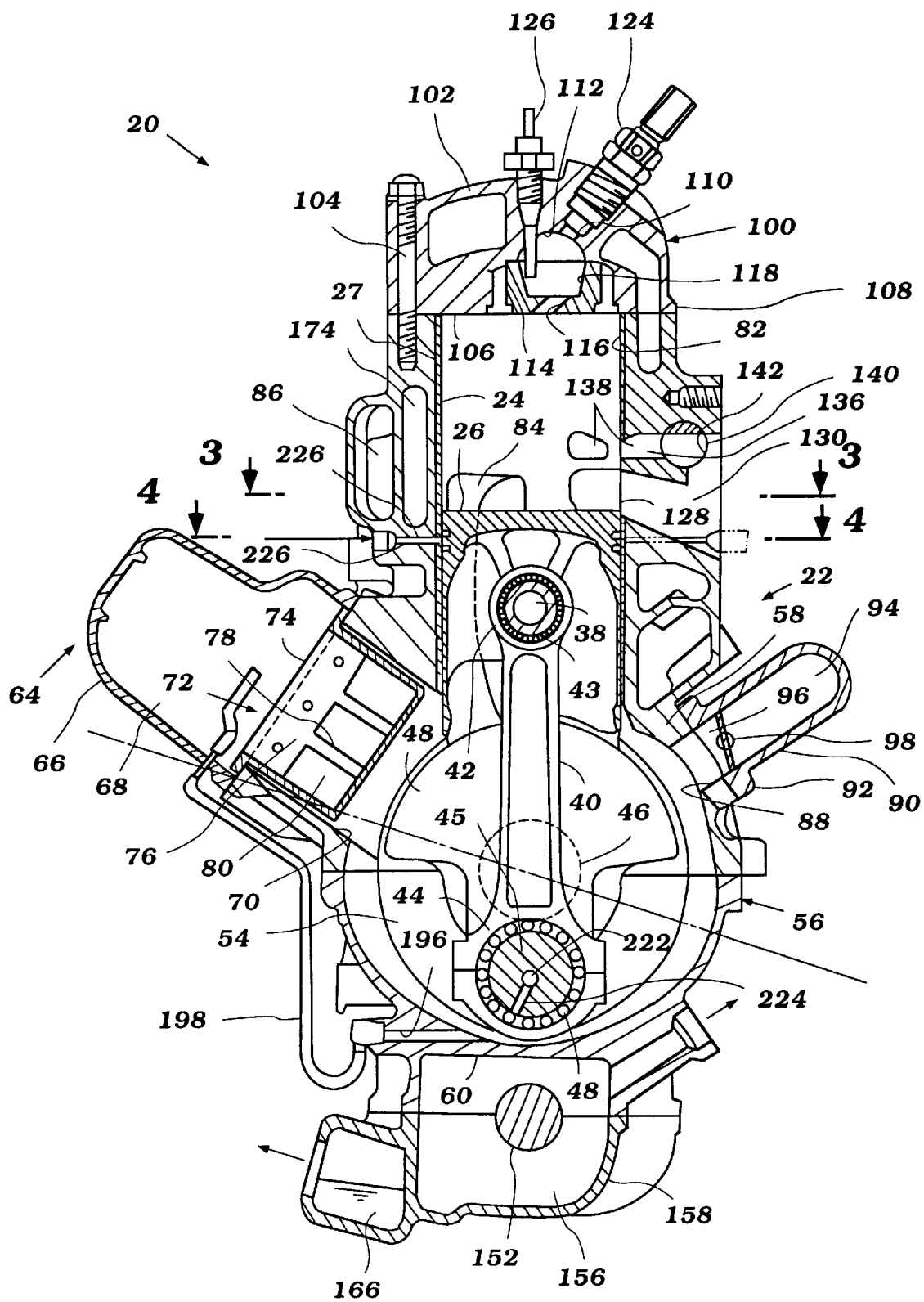
FIG. 1 is a cross-sectional view of the engine of the present invention.
Figure 2:
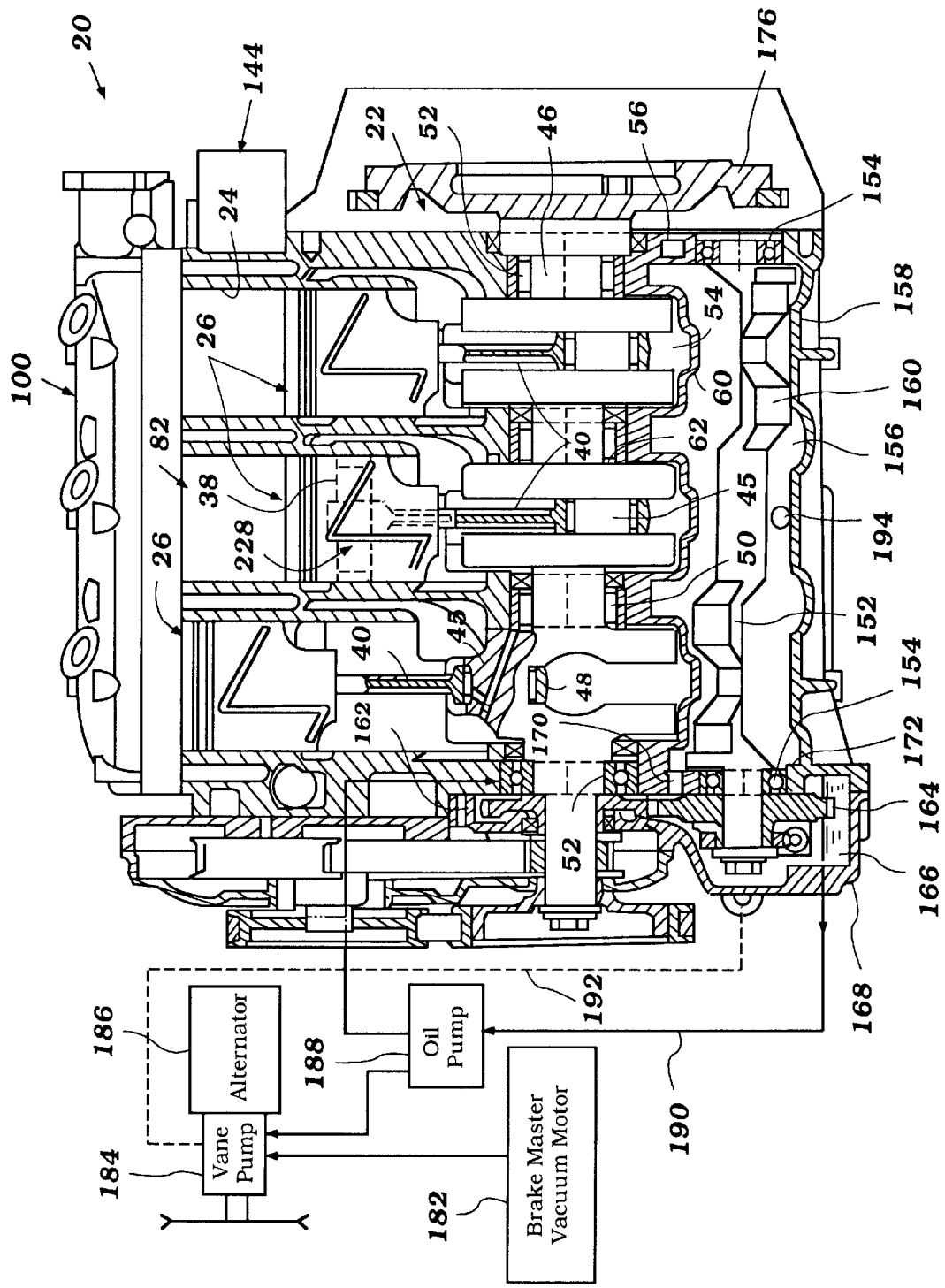
FIG. 2 is a side-elevational view of the engine of FIG. 1 with a portion of the engine broken away and other portions shown schematically.

Referring initially primarily to FIGS. 1–2, an internal combustion engine is identified generally by the reference numeral 20. The engine 20 is depicted as being of the three-cylinder, in-line type but it will be readily apparent to those skilled in the arts how the invention can be practiced with engines having other cylinder numbers and other cylinder configurations. In the illustrated embodiment, the engine operates on a two-cycle, crankcase-compression, diesel principle. Again, however, it will be readily apparent to those skilled in the art how the invention can be employed with engines operating on different cycles and with different combustion techniques spark ignition, for example.

The engine 20 includes a cylinder block assembly 22 constructed of an aluminum alloy in which three aligned cylinder bores 24 are formed in any known manner. Pistons 26 are slidably supported within each of the cylinder bores 24 and are in slidable contact with an inner surface of the cylinder or cylinder wall 27. The inner surfaces 27 of the cylinders have a chromium or nickel plating 28.

Figure 6:
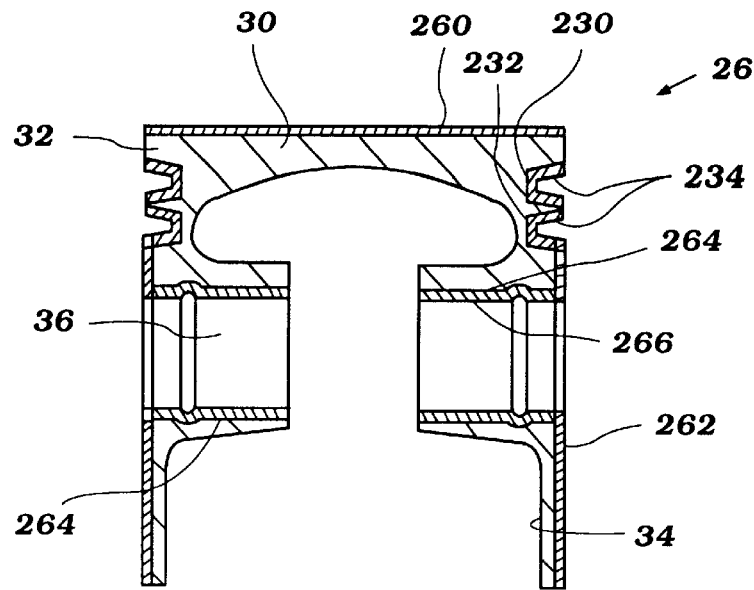
FIG. 6 is partially-enlarged, cross-sectional view of one embodiment of the piston plating arrangement of the present invention without the piston rings shown.
Figure 7:
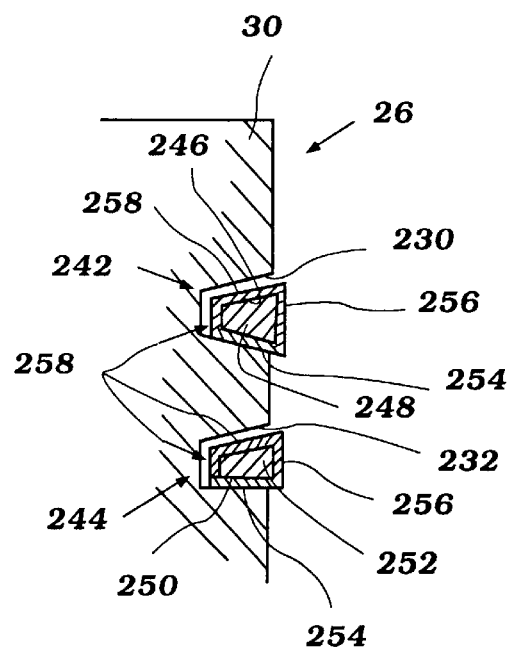
FIG. 7 is partially enlarged, cross-sectional view of one embodiment of the piston rings of the present invention.

Directing the reader's attention also to FIG. 6, each piston has a piston body 30 with a longitudinal axis that is coordinated with the longitudinal axis of the piston 26 itself and the longitudinal axis of the cylinder bore 24 that the piston 26 is slidably supported within. The piston body 30 is made of an aluminum alloy and comprises a piston head 32 in a disk shape at an upper end of the piston body 30 and a piston skirt 34 which extends downward circumferentially in the longitudinal direction from the outer surface of the piston head 32.

The pistons 26 include piston pin holes 36 through which the pistons 26 are connected by means of piston pins 38 (FIG. 1) to respective connecting rods, indicated generally by the reference numeral 40, at an upper or small end 42. The upper end 42 of the correcting rod is journaled on the piston pin 38 through needle bearings 43. Lower or big ends 44 of the connecting rods 40 are journaled on individual throws 45 of a crankshaft, indicated generally by the reference numeral 46, through needle bearings 48. The throws 45 have counter weight portions 48. The crankshaft 46 is journaled within intermediate main bearings 50 and end main bearings 52 (FIG. 2).

The crankshaft 46 rotates in a crankcase chamber 54 of a crankcase assembly 56 that is formed by a skirt 58 of the cylinder block 22 and a crankcase member 60 that is detachably connected thereto in a well known manner. The configuration of the crankcase chamber 54 is such as to maintain as small a clearance volume as possible for the crankshaft 46, as is desirable with two-cycle engine practice. As is also typical with two-cycle engine practice, the areas of the crankcase chamber 54 associated with each of the cylinder bores 24 are sealed from each other by seals 62 that are disposed adjacent the respective bearings 50 and 52, as is well known in this art.

An intake charge is delivered to the individual crankcase chambers 54 by an induction system, indicated generally by the reference numeral 64. Although not shown, the induction system 64 receives air from a vehicle air inlet silencer and cleaner through a duct. The induction system 64 includes an intake manifold 66 that has individual runners 68 that terminate at respective intake ports 70 formed in the crankcase 60 in communication with the respective crankcase chamber 54. Disposed within the runners 68 is a reed-type, check-valve, assembly 72 comprised of a caging member 74 that has a V-shaped configuration and which defines a recess 76 between its angularly disposed sides. These sides have openings 78. The flow through these openings 78 is controlled by reed-type valve elements 80 that are fixed to the caging member 74 in a well-known manner. Threaded fasteners, not shown, fix the manifold 66 to the crankcase assembly 56 with the reed-type valve caging member 74 being sandwiched therebetween.

As the pistons 26 move upwardly in the cylinder bores 24, they will cause a pressure drop in the respective crankcase chambers 54 causing air to flow through the induction system 64 towards the crankcase chambers 54. This air then enters the crankcase chambers 54 through the openings 78 of the reed-valve assemblies 72.

Figure 3:
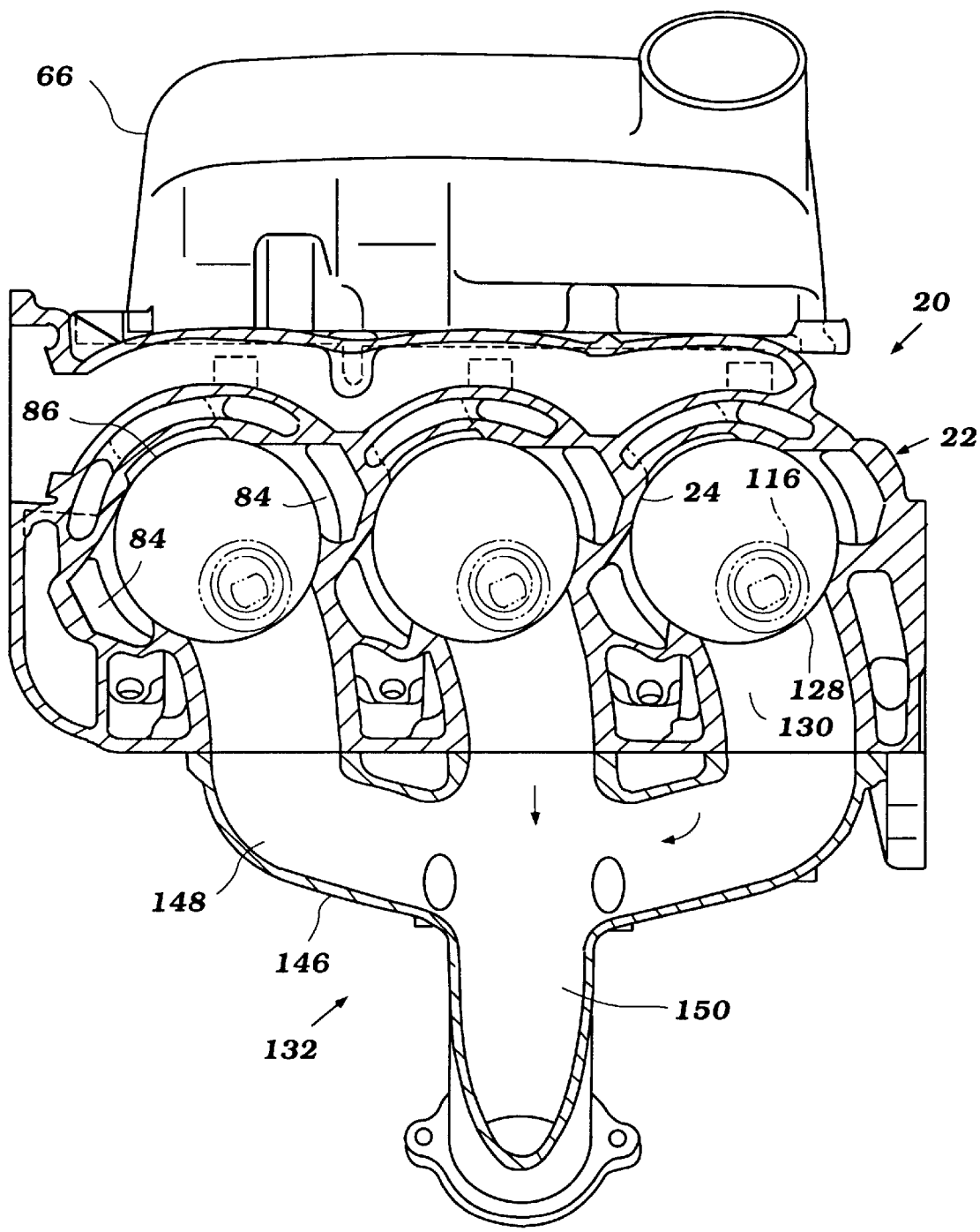
FIG. 3 is cross-sectional view taken along line 3—3 of FIG. 1.

As the pistons 26 move downwardly, this charge will be compressed and then transferred to a main combustion chamber, to be described, and indicated generally by the reference numeral 82. The reed-valve assemblies 72 preclude reverse flow into the induction system 64 during the compression of this charge in the crankcase chambers 54. As shown in FIGS. 1 and 3, this transfer of the charge to the combustion chambers 82 takes place through a pair of side scavenge passages 84 and a center scavenge passage 86 for each of the cylinder bores 24. The scavenge passages 84 and 86 terminate in respective scavenge ports that are formed in the cylinder block and which communicate with the cylinder bore in a well known manner. The charge that enters the combustion chamber 82 is further compressed as the pistons 26 move upwardly in the cylinder bores 24.

The engine 20 may also be provided with an arrangement for reducing the scavenging air flow under certain conditions. The skirt portion 58 of the cylinder block 56 is formed with three individual openings 88, one for each crankcase chamber 54. A manifold 90 is affixed to the cylinder block by fitted fasteners (not shown) through abutting flanges 92 on the manifold 90. The manifold 90 defines a longitudinally extending balance passage 94 and includes individual openings 96 in communication with the individual openings 88 in the skirt portion 58 of the cylinder block 56. A scavenging control valve 98 is disposed in the individual openings 96 of the manifold 90. When the scavenging control valve 98 is opened, the crank chamber 54 connected with the particular opening 96 is in communication with the balance passage 94, substantially enlarging the crank chamber volume and lowering the scavenging flow. In this manner, inner EGR gas increases and the combustion temperature drops. When the scavenging valve 98 is closed, the crank chamber volume returns to normal.

The combustion chamber 82 referred to above is formed by the cylinder bore 24, the piston head 32 and by a cylinder head assembly, indicated generally by the reference numeral 100. The cylinder head assembly 100 includes a main cylinder head member 102 cast of a heat-conductive material such as aluminum or aluminum alloy. The cylinder head member 102 and cylinder block 22 are affixed by fasteners 104. The cylinder head member 102 has a lower surface 106 in sealing relationship with an upper surface 108 of the cylinder block around the cylinder bores 24. A cylinder head gasket (not shown) may be interposed between the cylinder head member lower surface 106 and the cylinder block upper surface 108 for sealing purposes.

A precombustion chamber 110 is formed in the cylinder head assembly 100 in a manner now to be described. This precombustion chamber 110 is offset to one side of the cylinder bore 24 from the center of the cylinder bore 24. In a preferred arrangement, this offset is toward the side of the cylinder bore 24 away from the center scavenge passage 86. This precombustion chamber 110 is formed by a spherical segment 112 formed integrally with the cylinder head member 102 and at the base of a counter bore 114.

An insert piece, indicated generally by the reference numeral 116, is positioned within this counter bore 114 and affixed therein. The insert piece 116 is formed preferably from a heat-resistant steel, for example, a steel designated as SUH 3 according to the Japanese Industrial Standards (JIS). This material has a lower heat conductivity and thermal expansion than the aluminum of the main cylinder head member 102.

The insert piece 116 is formed with a recessed area 118 which has a surface of a segment of a cone with the upper diameter thereon being equal to the spherical diameter of the spherical segment 112 of the main cylinder head member 102. The lower part of the recessed area 118 may have any desired shape. Thus, the insert piece 116 and cylinder head member 102 form the precombustion chamber 110 previously described.

A transversely extending throat 120 is formed in the lower end of the insert piece 116 and communicates the precombustion chamber 110 with the main combustion chamber 82. This throat 120 is directed so that it will terminate substantially at the center of the cylinder bore 24 and direct the charge issuing therefrom downwardly into the cylinder bore 24 toward the scavenge port found at the end of the center scavenge passage 86.

The insert piece 116 has a cylindrical outer surface that is complimentary in diameter to the cylinder head counter bore 114. The insert piece 116 then terminates in a lower surface 122 through which the throat extends. The insert piece is fixed in the counter bore in a suitable manner.

A fuel injector 124 is mounted in the cylinder head member 102 and sprays fuel into the precombustion chamber 110. To assist in the initiation of starting and combustion, a glow plug 126 may be positioned with its tip in the precombustion chamber recess 118.

As the piston 26 approaches the top dead center position, and as the pressure rises in both the precombustion chamber 110 and main chamber 82, fuel is injected by the injector 124 and, due to the high temperature in the precombustion chamber 110, will ignite, burn and expand. This expansion occurs through the throat 120 so as to fire the charge in the main chamber 82 and complete the combustion and driving of the piston 26 downwardly.

As the piston 26 is driven downwardly, eventually an exhaust port 128, formed at the cylinder bore end of a main exhaust passage 130 extending through the cylinder block 22, will be uncovered by the piston 26, and the exhaust gases can be discharged to the atmosphere through the exhaust system, shown generally as 132 in FIG. 3. The exhaust port 128 is located on the side of the cylinder bore 24 opposite the scavenging passages 84 and 86 so that the scavenging charge will cause a Schnurl type of scavenging, forcing exhaust gases out of the combustion chamber 82.

The effective compression ratio of the engine may be controlled by an exhaust control system 134 in conjunction with auxiliary exhaust passages 136. Each auxiliary exhaust passage 136 joins with the main exhaust passage 130 and terminates at the cylinder bore 24 to form an auxiliary exhaust port 138. The exhaust control system (FIG. 4) includes three exhaust control valves 140 mounted in the sides of the exhaust passages 136 adjacent to the exhaust ports 138. These exhaust control valves 140 are mounted in bores 142 that extend transversely to the cylinder bores 24. The exhaust control valves 140 are coupled to one another in a tongue and groove arrangement in order to account for the expansion and contraction of the cylinder block 22 due to the varying heat conditions of the engine 20. Each exhaust control valve 140 includes rotary valve elements that have a cut out portion which when rotated will obscure the exhaust control passages 136 so as to in effect, vary the compression ratio of the engine 20. The exhaust control valves are driven by a servomotor 144 that is operated by any known type of control strategy for appropriately varying the compression ratio.

An exhaust manifold 146 (FIG. 3) is attached to the cylinder block 22 and communicates with the exhaust system 132 for discharging exhaust gases to the atmosphere. The exhaust manifold 146 includes individual runner sections 148, each extending from a respective one of the main exhaust passages 130 and terminating in a downwardly facing common collector section 150. The exhaust gases flow in the direction of the arrows.

In order to promote smooth running and minimum vibrations generated from the engine 20, the engine 20 is provided with a balancer shaft 152 which is rotatably journaled by means of a pair of spaced-apart bearings 154 (FIG. 2) within a balancer shaft chamber 156 formed beneath the crankcase chambers 54 and defined by the crankcase member 60 and a cover member 158 which is affixed thereto. The balancer shaft 152 has formed integrally therewith three eccentric masses 160, one for each cylinder for the associated engine. The balancer shaft 152 rotates in an opposite direction to the crankshaft 46 about an axis that is parallel to the axis of the crankshaft 46 and is driven by the crankshaft 46 in the following manner. The crankshaft 46 includes a driving gear 162 at one end that is in meshing engagement with a driven gear 164 provided at an end of the balancer shaft 152. Rotation of the crankshaft 46 in one direction causes opposite rotation in the balancer shaft 152 due to the operative relationship of the gears 162 and 164.

The gears 162 and 164 are located in a gear chamber 166 formed by the ends of the cylinder block 22, crankcase 60 and balancer cover 158, along with a gear cover 168. The gear chamber 166 communicates with the balancer chamber 156 through upper and lower communication holes 170 and 172, respectively, as seen in FIG. 2. The structure of gear chamber 166 provides adequate lubrication to the gears 162 and 164 in a manner which is known to those skilled in the art.

The engine 20 is water cooled, and to this end, both the cylinder block 22 and the cylinder head assembly 100 include water jackets 174. Water is circulated through these jackets 174 in any desired flow pattern by an appropriate coolant pump (not shown).

Figure 5:
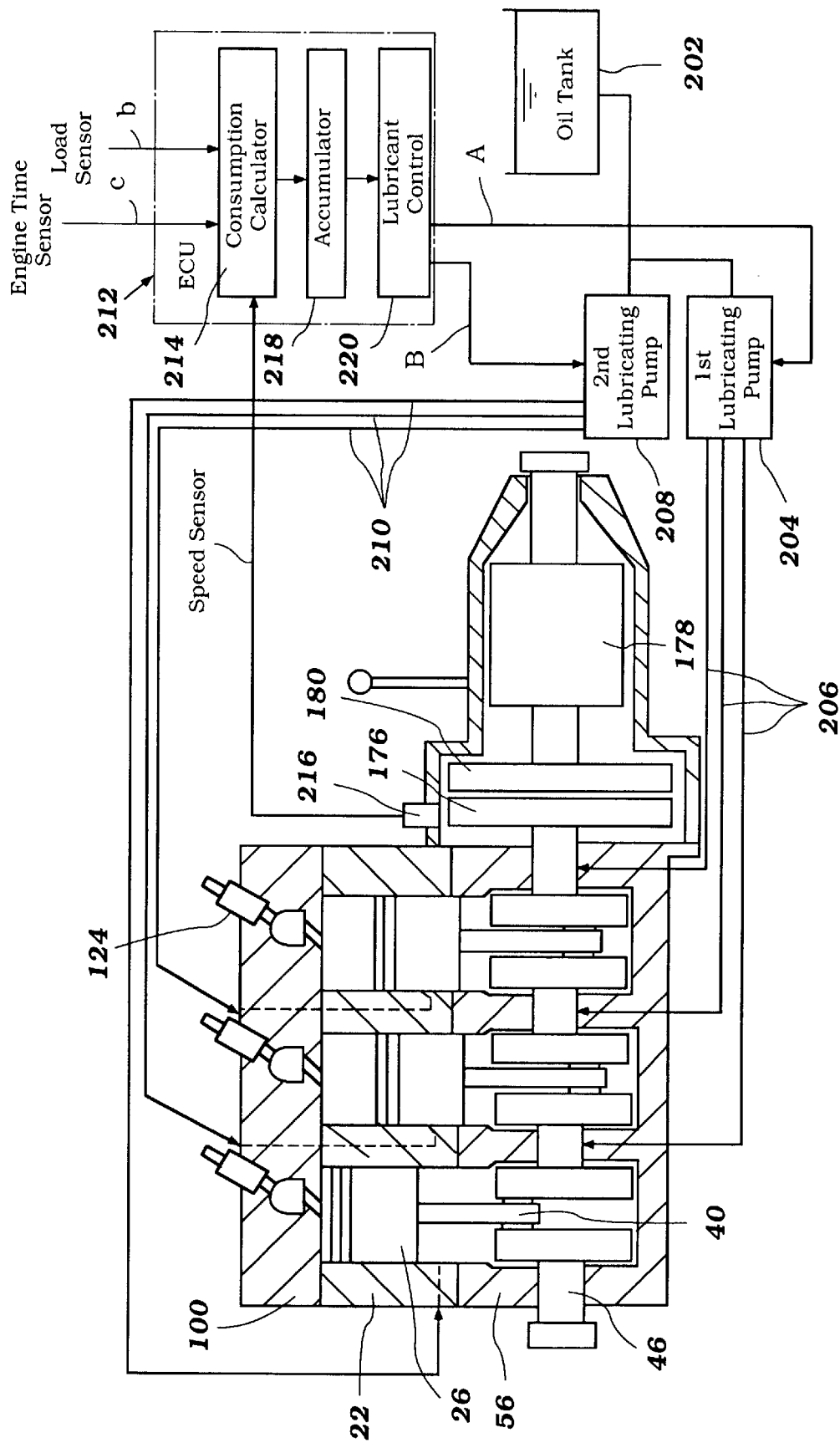
FIG. 5 is a partially-schematic, cross-sectional view taken through the cylinders of an engine showing the direct-lubricating system of the present invention.

The engine 20, as thus far described, is particularly adapted for driving the wheels of a motor vehicle. A flywheel 176 is affixed to an end of the crankshaft 46 opposite to the driving gear 162. A transmission 178 is coupled to the crankshaft 46 and is driven thereby, through a clutch 180, which is associated with the flywheel, as best seen in FIG. 5. This transmission 178 may drive the wheels of the vehicle through any known type of transfer drive and differential assembly (not shown).

The lubricating system for the engine 20 is composed of numerous individual lubricating systems for lubricating different areas of the engine 20. These individual systems will now be described. Because the engine 20 in a preferred embodiment is a two-cycle, diesel engine, the negative intake pressure for a brake booster vacuum motor 182 is often insufficient. With reference to FIG. 2, the engine 20 is provided with a negative pressure producing vane pump 184, or air compressor, coaxial with an alternator 186, which is driven by the crankshaft 46 through a serpentine belt (not shown). Lubricating oil is supplied to the air compressor 184 and the main bearing of the crankshaft 52 through an oil pump 188. The supply of lubricating oil is drawn through an oil passage 190 from the gear chamber 166.

Subsequently, the output air and lubricant mixture from the air compressor 184 is then channeled back to an upper region of the gear chamber through a mixture passage 192. A majority of the oil from the air and lubricant mixture from the air compressor 184 then condenses and joins with the oil in the gear chamber 166. Any remaining air and lubricant mixture goes into the balancer chamber 156 through the upper communication passage. Most of the remaining lubricating oil condenses and is separated and returns to the oil in the gear chamber 166 via the lower communication passage. The air, substantially separated of lubricating oil, is then supplied from an air discharge port 194 into the intake manifold 66 through a breather hose (not shown). The balancer chamber 156 thus functions as a breather chamber for separating oil and air mixture output from the air compressor 184.

An indirect lubricating system (not shown) may be provided in order to supply lubricants to the components of the crankcase chamber 54. The indirect lubricating system includes a single pump, which is controlled by an ECU and draws lubricant from a common oil tank. Lubricant is supplied to the inlet of the intake manifold 66 from the pump through a conduit. A pressure gage may be positioned in this conduit. This lubricant is provided upstream of the reed-type check valves 80 so that the lubricant will somewhat dampen the sounds created by the reed-type check valves 80. Because the lubricant from the system is introduced to the inlet of the intake manifold 66, it will be distributed equally to each crankcase chamber 54. Thus, the indirect lubricating system provides a smoother running engine and lubricates the components of the engine not directly lubricated, especially the piston pins 38.

It should be noted that some lubricant may collect in the crankcase chambers 54. This lubricant is drained by means of a passage 196 formed in the crankcase member 60 at a lower portion thereof. A fitting is connected to each passageway and includes a tube 198 that extends into the top of each intake manifold runner 68 upstream of the reed-type check valve assembly 72. During the running of the engine there will be a lower pressure at the end of the tube 198, and this will tend to draw lubricant from the crankcase chambers 54. If desired, the fitting may also include a check valve (not shown) so that lubricant will only flow in one direction.

Figure 4:
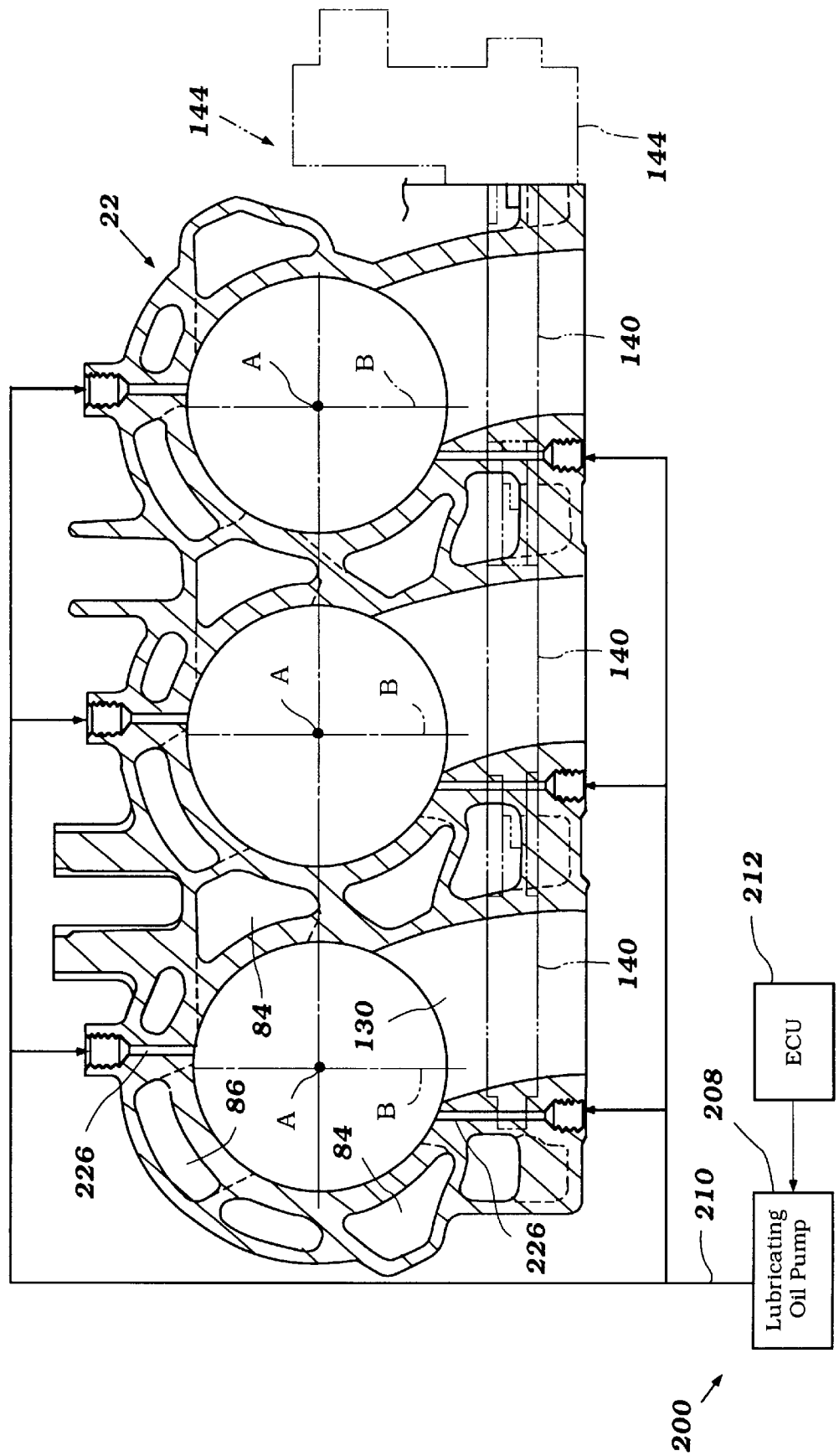
FIG. 4 is cross-sectional view taken along line 4—4 of FIG. 1.

The direct lubricating systems of the engine include a lubricating system that directly lubricates the crankshaft main bearings 50 and 52 and throws 45 and a direct-cylinder lubricating system, shown in FIG. 4 and indicated generally by reference numeral 200, for lubricating the cylinder wall 27, sliding surfaces of the pistons 26 and the piston pins 38. These lubricating systems are separately and independently controlled so that each portion of the engine will be adequately lubricated, but excess lubricant will not be supplied.

Referring primarily to FIG. 5, the direct lubricating systems include a lubricant reservoir, or oil tank 202, common for all of the systems, and mentioned above. A first lubricant pump 204 supplies lubricant through a first series of conduits 206 to the main bearings 50 and 52 and throws 45 of the crankshaft. A second oil pump 208 supplies lubricant through a second series of conduits 210 to the cylinders 24, pistons 26 and piston pins 38.

The operation of the pumps 204 and 208, and the amount of oil supplied thereby, is controlled by an ECU, indicated generally by the reference numeral 212, which outputs control signals "A" and "B" to the pumps 204 and 208, respectively, so as to control their time of operation and also their displacement per cycle.

The ECU includes a number of components, such as a consumption calculating unit 214 which includes a map that has been preprogrammed in response to engine running variables so as to provide an indication of the amount of lubricant required by the main bearings 50 and 52, throws 45, cylinders 24, pistons 26 and piston pins 38 in relation to the sense parameters. These sense parameters are engine speed as determined by a pulsar coil 216 that is positioned in proximity to the flywheel 176 and which outputs a speed signal ("a") to the consumption calculating unit 214. In addition, a load signal ("b") is also transmitted by a load sensor that determines load based on a parameter such as the amount of fuel injected by the fuel injectors, the intake air amount, the throttle valve opening, etc. Finally, a sensor that determines engine time transmits an engine time signal ("c") to the consumption calculating unit 214.

The consumption calculator 214 outputs a signal which indicates the amount of lubricant consumed in a given time unit, which may be one revolution of the crankshaft or which may be an actual time interval and outputs the signal to an accumulator 218 which sums the consumption figures to provide a total quantity signal indicative of the actual amount of lubricant consumed by the engine. This signal is then outputted to a lubricant control unit 220 that controls the operation of the pumps 204 and 208.

The system for lubricating the main crankshaft bearings 50 and 52 and throws 45 will now be described by particular reference to FIGS. 2 and 5. The lower portion of the cylinder block 22 is provided with a series of cross drillings (not shown) adjacent each of the bearings 50 and 52. Delivery passages (not shown) intersect these cross drillings and deliver the lubricant directly to these main bearings 50 and 52. The cross drillings communicate with the conduits 204.

In addition, the throws 45 of the crankshaft have a cross drilling 222 which begins adjacent to the respective main bearings 50 and 52, and picks up lubricants that are lubricating these main bearings 50 and 52. The cross drillings 222 are angularly disposed and are closed at their outer ends by plugs (not shown). An additional delivery passageway 224 intersects the cross passageway 222 so that the lubricant will flow by centrifugal force to lubricate the throw bearings 48 and big ends 44 of the connecting rods.

The direct piston and cylinder lubricating system 200 will now be described. The cylinder block 22 has a pair of transverse oil passages 226 for supplying lubricating oil to the sliding surfaces of each piston 26. These oil passages 226 penetrate the cylinder block 22 perpendicularly to the crankshaft 46 and are rotationally displaced around the cylinder axis. The oil passages 226 terminate at the cylinder bore 24 between piston rings of the piston 26, to be described, when the position of the piston 26 is at the bottom dead center and registers with the skirt 34 of the pistons during substantially its full stroke. These oil passages 226 are connected to the lubricating oil pump 208 through the oil supply conduits 210.

Each piston 26 has a pair of oil distributing grooves 228 (FIG. 2) found in the skirt portion 34 to uniformly spread oil supplied form the oil passages 226 over the piston skirt sliding surfaces 34. These distributing grooves 228 comprise axially disposed grooves offset circumferentially around each piston so as to register with the oil passages 226 and the cylinder bore 24. Obliquely disposed generally circumferential grooves extend from the upper and lower ends of the axial grooves. These circumferential grooves extend generally perpendicularly to the axis of the piston 26 and ensure that lubricant is delivered substantially around the entire circumference of the piston skirt 34. Because of this orientation, the reciprocation of the piston 26 will cause lubricant to be distributed along the full circumferential extent of the grooves 228. The axial grooves ensure the skirt sliding surfaces 34 of each piston 26 can be lubricated around their circumferences with a smaller number of oil holes 226 in each cylinder bore wall 27. Further, because oil remains in the grooves 228 even when the engine is out of operation for long periods, lubrication can be resumed instantly after restarting the engine.

Figure 8:
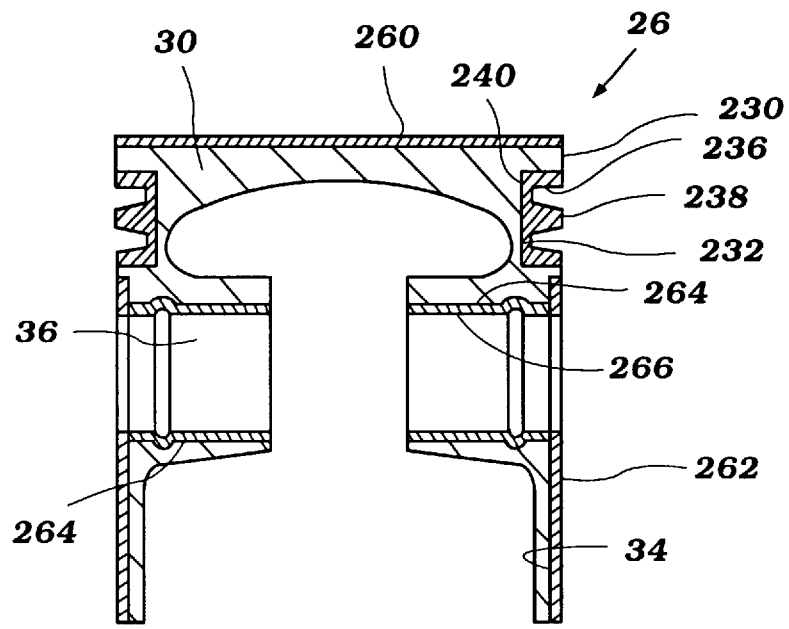
FIG. 8 is a partially enlarged, cross-sectional view of a second embodiment of the piston plating arrangement of the present invention without the piston rings shown.

The piston plating arrangement of the present invention will now be described. An upper ring groove 230 and a lower ring groove 232 are provided at an interval on the outer surface, or skirt 34, of the piston body 30 adjacent the piston head 32. The grooves 230 and 232 include a molybdenum disulfide plating 234 (FIG. 6) or are constructed of a nickel-resist cast iron alloy 236 (FIG. 8). The ring grooves 230 and 232 may be formed directly in the piston skirt 34 of the piston body 30 (FIG. 6) or, alternatively, the piston rings grooves 230 and 232 may be provided in an insert piece 238 that is fit into a recessed area 240 of the piston body 30.

An upper piston ring 242, or compression ring, and a lower piston ring 244, or oil ring, are fit into the upper ring groove 230 and lower ring groove 232, respectively, in such a way that the rings 242 and 244 can be freely put on and taken off. The upper ring 242 serves more to form an airtight seal in order to facilitate compression and expansion of gases in the cylinder bores 24. The lower ring 244 functions more as the main sliding surface ring.

Figure 9:
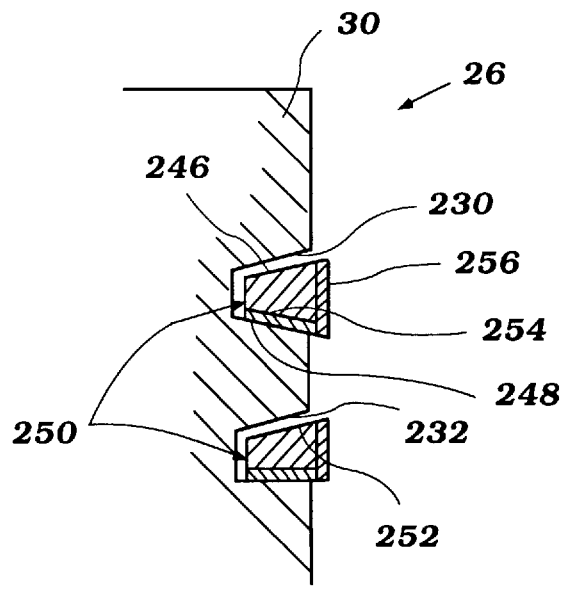
FIG. 9 is a partially-enlarged, cross-sectional view of a second embodiment of the piston rings.

The piston rings 242 and 244 include an upper and lower surface, 246 and 248, respectively, and an inner and an outer sliding surface, 250 and 252, respectively. The lower surface 248 is treated with a resin layer 254. The outer sliding surface 252 includes a chromium or nickel plating 256. The inner and upper surfaces, 250 and 246, are coated with a phosphate layer 258. In another embodiment, as shown by FIG. 9, the inner and upper surfaces, 250 and 246, may not be coated with a phosphate layer. The plating and coating arrangement of the piston ring and groove combinations prevents piston rings 242 and 244 from sticking to the piston ring grooves 230 and 232 and the uneven wear on the piston ring outer surfaces that results because the piston rings 242 and 244 are not free to rotate around the piston body 30.

The outer surface 252 of the rings 242 and 244 and the inner surface 27 of the cylinder include a chromium plating so that the piston rings 242 and 244 can freely slide in the longitudinal axial direction upon the inner surface 27 of the cylinder without causing frictional wear on the sliding surfaces, especially the inner surface 27 of the cylinder.

The piston head 32 includes a nickel plating 260 for protecting the piston head 32 from the driving forces caused by repeated combustion. The piston skirt 34 includes a tin plating 262 providing abrasion resistance for preventing frictional wear and seizing between the piston skirt 34 and the inner surface 27 of the cylinder. The piston pin holes 36 form an inner diameter surface 264 in the piston body 30. The inner diameter surface 264 includes a molybdenum disulfide plating 266 for improved lubrication between the piston pin 38 and the piston body 30, resulting in increased engine performance.

The particular construction of the plating and coating arrangement of the present invention mentioned above enhances engine lubrication, prevents exhaust carbon build-up on the cylinder surfaces 27 and prevents piston rings 242 and 244 from sticking during reciprocation of the piston. Improved lubricity causes decreased frictional abrasion, especially between the sliding surfaces of the piston and inner cylindrical surface.

To further enhance the advance of engine lubrication, the lubricating system of the present invention includes a lubricating oil with a polyisobutane additive. The composition of the oil prevents excessive wear by providing an adequate oil film between sliding surfaces, prevents deposit accumulation and removes heat from the areas of relatively high temperature within the engine. The oil has a composition that is 20% polyisobutane, 60% mineral oil, 15% diluting agent and 5% other chemical additives. Because of the high exhaust temperatures and potential smoke problems with diesel engines during combustion, this oil has been formulated to have particular application to such engines without problems from these conditions.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. An internal combustion engine comprising a cylinder block and head assembly, said cylinder block and head assembly including a plurality of cylinders, a lubrication system for delivering oil to said cylinders, a piston disposed in each of said cylinders so as to reciprocate in an axial direction of said cylinders, each of said pistons including a cylindrical piston head provided at an upper end of said piston, a piston skirt integrally connected to said piston body and a piston pin boss, at least one piston ring groove provided in said piston head, a piston ring fitted in said at least one piston ring groove, said piston ring including an inner and outer sliding surface and an upper and lower surface, said piston pin boss forming a piston pin hole adapted to receive a piston pin, a molybdenum disulfide plating arrangement on at least said piston pin hole of said piston so as to enhance lubricity of said piston, the upper surface of said piston head facing a combustion chamber formed by said cylinder block and head assembly being formed with a nickel plating, and a tin plating on the portion of said piston skirt facing the cylinder being tin plated.

2. The internal combustion engine of claim 1, wherein said at least one piston ring groove also includes a molybdenum disulfide plating.

3. The internal combustion engine of claim 2, wherein said piston includes a ring-groove insert piece forming said at least one piston ring groove.

4. The internal combustion engine of claim 1, wherein said at least one of piston ring groove is constructed of a cast iron alloy.

5. The internal combustion engine of claim 4, wherein said piston includes a ring-groove insert piece that forms said at least one piston ring groove.

6. The internal combustion engine of claim 1, wherein said piston ring outer sliding surface includes a chromium plating and said lower surface includes a phosphate layer.

7. The internal combustion engine of claim 6, wherein said piston ring includes a phosphate layer on said upper and inner surfaces.

8. The internal combustion engine of claim 1, wherein said oil includes a polyisobutane additive.

9. The internal combustion engine of claim 8, wherein said oil includes a composition of 20% polyisobutane, 60% mineral oil, 15% diluting agent and 5% additives.

* * * * *